Feb. 28, 1928.
G. B. BOYD
1,661,029
HYDRAULIC BRAKE FOR VEHICLES
Filed June 30, 1926
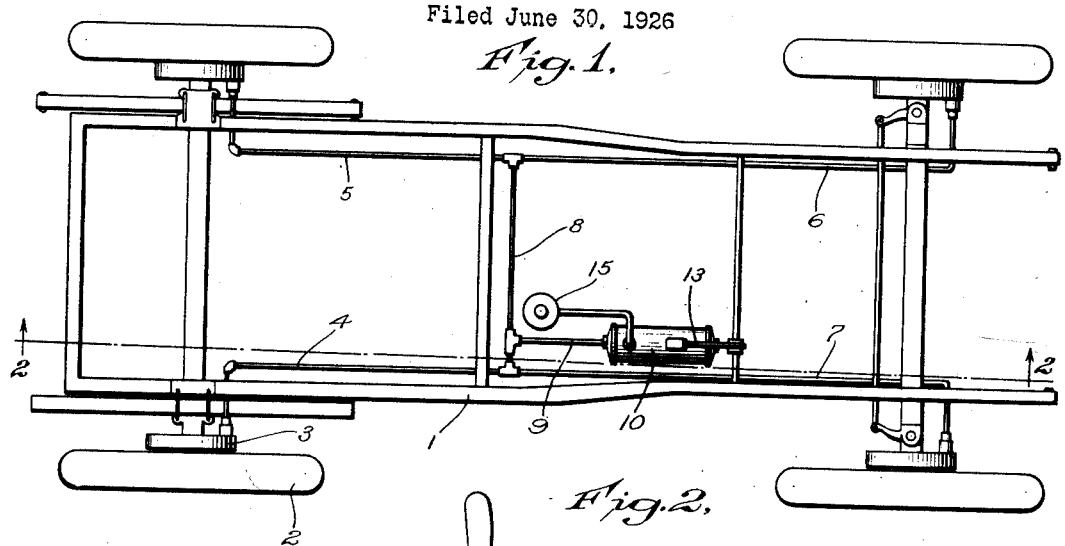
Fig. 1.
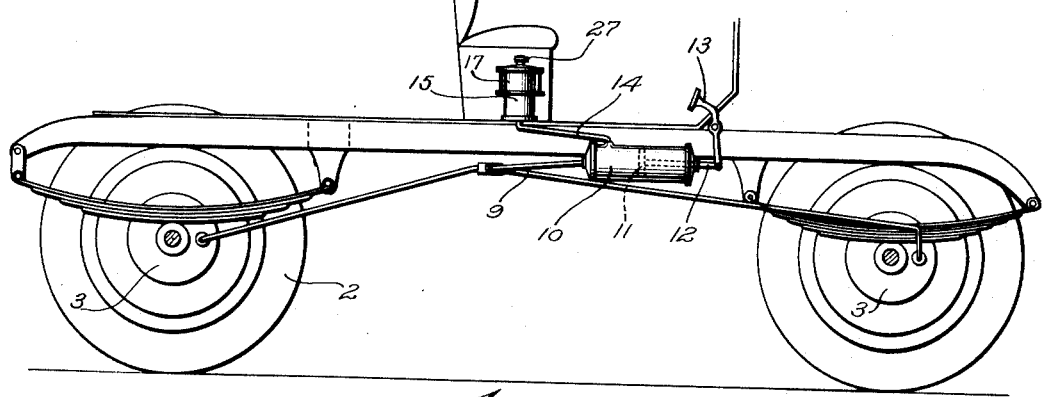
Fig. 2.
Fig. 4.    Fig. 3.    Fig. 5.
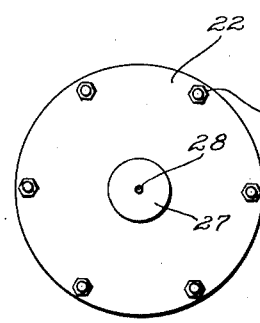
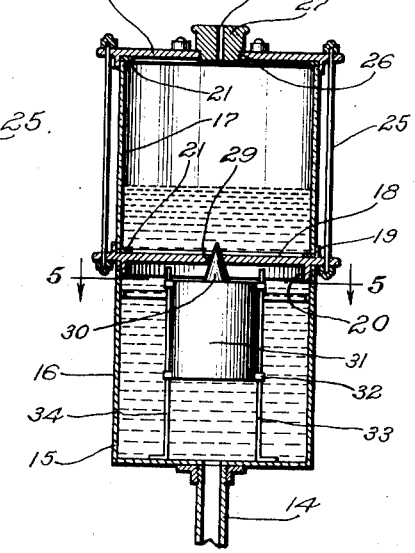
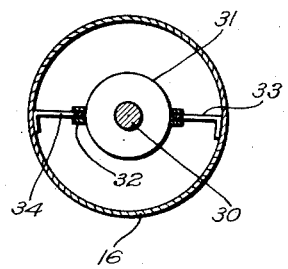
WITNESSES
INVENTOR
GEORGE B. BOYD
BY
ATTORNEYS Patented Feb. 28, 1928.

1,661,029

UNITED STATES PATENT OFFICE.

GEORGE B. BOYD, OF DUNELLEN, NEW JERSEY.

HYDRAULIC BRAKE FOR VEHICLES.

Application filed June 30, 1926. Serial No. 119,698.

This invention relates to hydraulic brakes for vehicles and particularly to an improved construction of brake adapted for use on automobiles, the construction being such that air bubbles are automatically withdrawn from the brake mechanism adjacent the wheels.

The object of the invention is to provide a hydraulic brake structure for automobiles or other vehicles wherein means are provided for maintaining the supply of liquid while automatically discharging any air that may become mixed with the liquid.

Another object of the invention is to provide in a hydraulic brake structure for automobiles means for venting the brake with air and at the same time supplying new fluid to take the place of the vented air.

A further object, more specifically, is to provide a hydraulic brake apparatus for automobiles wherein the parts are all inclined upwardly so that air in any part of the system will automatically move toward the highest point.

In the accompanying drawing—

Figure 1 is a top plan view of part of an automobile with a brake structure embodying the invention shown applied thereto.

Figure 2 is a sectional view through Figure 1, approximately on line 2—2.

Figure 3 is an enlarged fragmentary vertical sectional view through a combined vent structure and supply tank embodying certain features of the construction.

Figure 4 is a top plan view of the structure shown in Figure 3.

Figure 5 is a sectional view through Figure 3 on line 5—5.

Referring to the accompanying drawing by numerals, 1 indicates the chassis of an automobile, the same being supplied with wheels 2 in the usual manner and associated with each of the four wheels is a hydraulic brake structue 3 of any usual or preferred structure. It is, of course, evident that the brake structure 3 could be applied to one, two or all of the wheels as preferred. In hydraulic brakes as now commonly used, there is one associated with each of the four wheels of the automobile and during the use of the brake apparatus air accumulates in the various brake devices 3. Heretofore, various means have been provided for draining this accumulated air from time to time but unless it is frequently removed, the brakes do not all operate as efficiently as they should. In the present invention, a structure has been provided which automatically vents or removes the air accumulated in the brake structure 3.

As shown in the accompanying drawing, the various brake structures 3 are connected to the various pipes 4, 5, 6 and 7. These pipes are in turn connected with a cross pipe 8 which is connected through pipe 9 to the compression cylinder 10. This compression cylinder carries the usual piston 11 actuated through the piston rod 12 connected to the pedal 13. Whenever pedal 13 is actuated, piston 11 will be moved and some of the liquid from the cylinder 10 will be forced into pipe 9 and the liquid in this pipe and the other pipes will be brought under pressure whereby the brakes will be applied. From Figure 2 it will be observed that the pipes 4, 5, 6 and 7 all incline upwardly to pipe 8 and also that pipe 9 inclines upwardly from pipe 8 to the cylinder 10. A pipe 14 acting as a supply pipe and a vent pipe is connected to the upper part of cylinder 10 and discharges or rather opens into the bottom of the supply tank and vent structure 15. This supply tank and vent structure is shown in detail in Figures 3 to 5 and from these figures it will be noted that the structure 15 is provided with a casing 16 forming a lower compartment and with an auxiliary casing 17 forming an upper compartment. These casings or compartments are divided by a partition 18 preferably of metal. Casing 16 is preferably of metal while casing 17 is preferably of glass whereby the level of oil therein may be readily observed at any time. The division plate 18 is provided with an annular upstanding flange 19 and an annular depending flange 20, said depending flange being threaded exteriorly whereby the casing 16 may be screwed thereon for providing a tight connection. A gasket 21 is arranged between the division plate 18 and the glass casing 17. Also a gasket 21 is arranged between the glass casing 17 and the cover 22. This provides an airtight arrangement which functions properly when the clamping bolts or rods 25 are placed in position. It will be noted that the rods or bolts 25 extend through the outer part of the division plate 18 and the outer part of cover 22 whereby these parts are clamped tightly against the glass casing 17. The cover 22 is provided with a large opening 26 which is preferably threaded so as to receive the plug 27, said plug having a vent 28.

When it is desired to add more oil, plug 27 is removed and the oil added, after which, the plug is reinserted. The division plate 18 is provided with an aperture or passageway 29 adapted to be normally closed by the tapering valve member 30 carried by the float 31. The float 31 is provided with guiding legs 32 engaging the respective guiding brackets 33 and 34, secured to the bottom and sides respectively of the casing 16. When the apparatus is in use, casing 16 is always maintained full of oil or other liquid and preferably casing 17 is maintained partly full. Whenever air accumulates in the casing 16, it will cause the float 31 to be lowered and will thereupon quickly escape through the passage-way 29 into the casing 17 and from thence out through the vent 28.

In operation, when a small bubble of air has been accumulated in any of the brake structures 3 it will gradually pass therefrom upwardly through one of the pipes to the cross pipe 8 and from thence will gradually move upwardly into the cylinder 10 from which it will pass through pipe 14 and then to the casing 16. If only one small bubble was all that was generated or accumulated, no further action would take place but during the use of the braking apparatus, other bubbles will be accumulated and will pass upwardly and be discharged into the casing 16. These will automatically accumulate at the top of the chamber and by and by when a sufficient quantity of air has been thus accumulated the float 31 will move downwardly and the air will escape through the opening 29 into casing 17 and from thence through vent 28 to the atmosphere. While the air is escaping, some of the liquid in the casing 17 will pass downwardly into casing 16 so that as the air escapes new liquid passes into casing 16 and float 31 again moves upwardly for closing opening 29. It will, of course, be evident that this up and down movement is only very slight and that the valve 30 is closed most of the time. By this action, proper liquid columns are provided in the brake system so that any tension produced in the cylinder 10 by the actuation of pedal 13 will be quickly and evenly distributed to all of the brake structures 3. Also, by reason of this structure not only will the air be properly vented but a new supply of oil or other liquid will be continually supplied to the system. From time to time a new supply of liquid must be deposited in casing 17 through the opening normally closed by plug 27.

What I claim is:

1. An automatic venting system for hydraulic brakes of automobiles comprising a tube connected to each of said brakes, all of said tubes being inclined upwardly, tubular means for connecting the upper ends of all of said tubes together, a cylinder connected with said tubular means, and a pipe acting in the double capacity of a liquid supply pipe and an air vent pipe, said pipe being connected to the upper part of said cylinder, a liquid supply tank connected to the upper end of said pipe, said tank having a vent opening in the top, an auxiliary liquid supply tank positioned to discharge liquid through said vent opening into the supply tank, and a float actuated valve for normally closing the vent opening in the tank.

2. A venting system for a hydraulic brake apparatus for automobiles and other vehicles, comprising a power cylinder, means for venting said cylinder and also for supplying fluid automatically to the cylinder, said means including a casing divided into an upper and lower compartment, said compartment having a passage-way therebetween, and a float operated valve for normally closing said passage-way.

3. A venting system for a hydraulic brake apparatus for vehicles comprising a series of inclined pipes and means for automatically venting the pipes at their highest point, said means including a venting apparatus provided with upper and lower casings, a division plate arranged between said casings, said division plate having an aperture, a float actuated valve for normally closing said aperture, and means forming a vent for one of said casings.

4. A venting system for a hydraulic brake apparatus for vehicles comprising a series of inclined pipes, means forming upper and lower casings presenting upper and lower chambers, said upper casing being formed of glass whereby the level of liquid therein may be seen, an apertured division plate arranged between said casings, a float actuated valve for normally closing the aperture in said plate, and means for connecting said casings and said division plate together.

GEORGE B. BOYD.